United States Patent
Shim et al.

(10) Patent No.: US 12,027,729 B2
(45) Date of Patent: Jul. 2, 2024

(54) IONIC DIODE MANUFACTURING METHOD USING PARTIAL THERMAL EXPANSION OF VERMICULITE-BASED LAMINATED FILM AND SALINITY DIFFERENCE POWER GENERATION SYSTEM USING THE SAME

(71) Applicant: INDUSTRY-ACADEMIC COOPERATION FOUNDATION, YONSEI UNIVERSITY, Seoul (KR)

(72) Inventors: Wooyoung Shim, Seoul (KR); Sungsoon Kim, Ulsan (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 87 days.

(21) Appl. No.: 17/646,249

(22) Filed: Dec. 28, 2021

(65) Prior Publication Data
US 2023/0170497 A1 Jun. 1, 2023

(30) Foreign Application Priority Data
Nov. 30, 2021 (KR) .................. 10-2021-0168781

(51) Int. Cl.
*H01M 8/0247* (2016.01)
*H01M 8/0236* (2016.01)
(Continued)

(52) U.S. Cl.
CPC ....... *H01M 8/0247* (2013.01); *H01M 8/0236* (2013.01); *H01M 8/0245* (2013.01);
(Continued)

(58) Field of Classification Search
CPC . H01M 2300/0068; H01M 2300/0094; H01M 8/0236; H01M 8/0245;
(Continued)

(56) References Cited

U.S. PATENT DOCUMENTS 4,715,987 A * 12/1987 Rittler ............... C01B 33/20
501/148
4,746,570 A 5/1988 Suzaki et al.
(Continued)

OTHER PUBLICATIONS

Zou, Y. et al., "Ion exchange in atomically thin clays and micas," Nature Materials, vol. 20, Aug. 26, 2021, 49 pages.
(Continued)

*Primary Examiner* — Brian R Ohara
*Assistant Examiner* — Brent C Thomas
(74) *Attorney, Agent, or Firm* — McCoy Russell LLP

(57) ABSTRACT

The present disclosure relates to a salinity (NaCl) difference energy generating system and, more particularly, to a method of manufacturing a structural asymmetric ionic transport channel by inducing partial thermal expansion of a laminated film in which vermiculite is re-stacked and an energy generating system capable of producing power by abundant low-cost resources based on the method. The energy power generating device according to the present disclosure is capable of generating power with an easy capacity control and abundant low-cost resources, and the energy power generating device satisfying size characteristics, structural stability characteristics, and furthermore, filtering characteristics may stably produce electrical energy using a solution having a concentration similar to that of seawater and river water.

14 Claims, 3 Drawing Sheets

(51) Int. Cl.
  *H01M 8/0245* (2016.01)
  *H01M 8/1016* (2016.01)
(52) U.S. Cl.
  CPC .. *H01M 8/1016* (2013.01); *H01M 2300/0068* (2013.01); *H01M 2300/0094* (2013.01)
(58) Field of Classification Search
  CPC .... H01M 8/0247; H01M 8/1016; H01M 8/18; H01M 8/227
  See application file for complete search history.

(56) References Cited

U.S. PATENT DOCUMENTS

| | | | |
|---|---|---|---|
| 2010/0247751 A1* | 9/2010 | Gros | C04B 35/6263 |
| | | | 252/508 |
| 2015/0140473 A1* | 5/2015 | Abusleme | H01M 8/1051 |
| | | | 429/316 |
| 2018/0353906 A1 | 12/2018 | Mottet et al. | |
| 2022/0140384 A1* | 5/2022 | Reuven | H01M 4/62 |
| | | | 429/161 |
| 2022/0158216 A1* | 5/2022 | Ma | H01M 8/227 |

OTHER PUBLICATIONS

European Patent Office, Extended European Search Report Issued in Application No. 21217864.4, May 24, 2022, Germany, 10 pages.

* cited by examiner

IONIC DIODE MANUFACTURING METHOD USING PARTIAL THERMAL EXPANSION OF VERMICULITE-BASED LAMINATED FILM AND SALINITY DIFFERENCE POWER GENERATION SYSTEM USING THE SAME

CROSS REFERENCE TO RELATED APPLICATION

The present application claims priority to Republic of Korea Patent Application No. 10-2021-0168781 filed on Nov. 30, 2021 The entire contents of the above-listed application is hereby incorporated by reference for all purposes.

TECHNICAL FIELD

The present disclosure relates to a salinity (NaCl) difference energy generating system and, more particularly, to a method of manufacturing a structural asymmetric ionic transport channel by inducing partial thermal expansion of a laminated film in which vermiculite is re-stacked and an energy generating system capable of producing power by abundant low-cost resources based on the method.

BACKGROUND

Ion current rectification, which enables ion conduction in a specific direction and suppresses ion conduction in the opposite direction, may be induced when a structure of a channel through which ions pass is asymmetric. When ions pass into the channel having an asymmetric structure, ion accumulation occurs in the channel in a specific direction, and ion depletion occurs in the opposite direction. When ions are depleted inside the channel, ionic conductivity of the channel decreases, and when ions are accumulated inside the channel, the ionic conductivity increases. Since this directionality of conduction may prevent ion conduction in an unwanted direction, current is prevented from flowing back in salinity power generation, thereby significantly reducing resistance and increasing power generation.

In order for a structure having an asymmetric structure of an ion transport channel to be introduced into a salinity power generating system, there are several important conditions. First, structural stability of the ion transport channel is required to maintain constant performance for a long time; second, ease of a fabrication method capable of forming a large amount of the ion transport channels with an asymmetric structure in a unit membrane is required; and third, the membrane continuity of the ion transport channels is required.

Although some asymmetric ion transport channels have been introduced into salinity difference power generation devices, a channel fabrication method by chemical etching has the disadvantage of being complicated and expensive, and a method of bonding porous polymer-based membranes having different pore sizes has the disadvantage in that resistance increases because the channels may be connected discontinuously.

Therefore, it is still difficult to introduce an ion transport channel having an asymmetric structure that satisfies all of structural stability, the possibility of mass production of channels, and channel continuity.

Technical Problem

An object of the present disclosure is to provide an ion transport channel applicable to salinity difference energy generation by providing a channel having an asymmetric structure that causes ion rectification through partial thermal expansion of a vermiculite-based laminated film.

Another object of the present disclosure is to provide an energy generating device capable of easily controlling capacity and generating power using abundant, inexpensive resources using a channel having an asymmetric structure.

Technical Solution

The present disclosure provides an energy generating device for producing power by conduction of alkali ions through an ion transport channel having an asymmetric structure, wherein the energy generating device includes a laminated film in which vermiculite is laminated and assembled, wherein the laminated film includes a first region in which alkali ions are introduced; a second region in which alkali ions having a lower concentration than those of the first region are introduced or into which alkali ions are not introduced; a third region connected to the second region and extending in an interlayer distance by heat; and a fourth region connected to the first region and the third region and having an interlayer distance smaller than the third region.

In the energy generating device according to the present disclosure, a liquid in which moisture contained in a gas phase is transformed into a liquid phase may be included between the layers of vermiculite, the energy generating device may have selectivity for cations, and lithium ions may be included inside the vermiculite layer.

In the energy generating device according to the present disclosure, a length of the fourth region in a direction from the first region to the second region may be 0.5 to 10 mm, an interlayer spacing of the laminated film in the third region may be 2 nm or more, and an interlayer spacing of the laminated film in the fourth region may be 1 to 9 Å.

In the energy generating device according to the present disclosure, when the following conditions 1, 2 and 3 are satisfied, the non-ohmic conductance between the first region and the second region may satisfy Equation 1 below.

Condition 1: The same alkali ion concentration in the first region and the second region,
Condition 2: 3 mm to 6 mm in length from the third region to the fourth region,
Condition 3: Voltage sweep range from −0.4 V to +0.4 V $$1 < I_{(+)}/I_{(-)} \qquad \text{(Equation 1)}$$

(In Equation 1, $I_{(+)}$ is a current value in a positive voltage range, $I_{(-)}$ is a current value in a negative voltage range, and $I_{(+)}/I_{(+)}$ is a rectification ratio.)

In the energy generating device according to the present disclosure, total power or output voltage generated by the energy generating device may be controlled by one or more factors selected from among one or more physical factors selected from a thickness, width, and length of the laminated layer; and one or more chemical factors selected from a total number of moles of alkali ions introduced into the first region and a total number of moles of alkali ions introduced into the second region.

The present disclosure provides a method of using an energy generating device including: (a) introducing solutions of different concentrations into the first region and the second region of the energy generating device according to any one of claims 1 to 9; and (b) connecting electrodes to the first region and the second region.

The present disclosure provides a method of manufacturing an energy generating device including: (a) laminating and assembling vermiculite to prepare a laminated film; (b)

physically fixing a third region of the laminated film; (c) exposing a fourth region of the laminated film to a high temperature; (d) exchanging ions in the laminated film exposed to the high temperature; (e) physically fixing the third region and the fourth region; and (f) connecting the laminated film to a first region and a second region, wherein the third region may be connected to the second region and the fourth region, and the fourth region may be connected to the first region and the third region.

In the method of manufacturing an energy generating device of the present disclosure, a temperature at the time of partial thermal expansion of step (c) may be 500° C. or higher, and in the ion exchange step of (d), cations inside the laminated film may be exchanged with sodium ions and then exchanged with lithium ions, and in (b) and (e), the physical fixing may be achieved by applying a curable resin and solidifying a resin strip.

The present disclosure provides an energy generating module to which the energy generating device is connected in series.

Effect of Disclosure

The energy generating device according to the present disclosure, which easily adjusts capacity and is capable of generating power by abundant low-cost resources, and which satisfies size characteristics, structural stability characteristics, and furthermore, filtering characteristics, has advantageous of producing electric energy stably using a solution having a concentration similar to that of seawater and river water.

DETAILED DESCRIPTION

Best Mode

Hereinafter, an energy generation apparatus according to an exemplary embodiment of the present disclosure will be described in detail with reference to the accompanying drawings.

The drawings presented hereinafter are provided as examples to sufficiently transmit the technical concept of the present disclosure. Thus, the present disclosure is not limited to the drawings presented hereinafter and may be embodied in a different form, and the drawings present hereinafter may be exaggerated to be illustrated to clarify the technical concept of the present disclosure.

Here, technical terms and scientific terms have the same meaning as generally understood by a person skilled in the art to which the present disclosure pertains, unless otherwise defined, and a detailed description for a related known function or configuration considered to unnecessarily divert the gist of the present disclosure will be omitted in the following descriptions and accompanying drawings.

Also, as used herein, the singular forms used in the specification and claims are intended to include the plural forms as well, unless the context clearly indicates otherwise.

In this specification and the appended claims, terms such as first, second, etc. are used for the purpose of distinguishing one element from another, not in a limiting sense.

In this specification and the appended claims, terms such as include or have mean that features or elements described in the specification are present, and unless specifically limited, they do not rule out in advance the possibility that one or more other features or elements are added.

In this specification and the appended claims, when a part of a film (layer), region, component, etc. is said to be on or on another part, this description should be construed as including a case where other films (layers), other regions, other components, etc. are interposed therebetween as well as a case in which they are present immediately on in contact with other parts.

An energy generating device for producing power (including electromotive force) by conduction of alkali ions through an ion transport channel having an asymmetric structure, wherein the energy generating device includes a laminated film in which vermiculite is laminated and assembled, wherein the laminated film includes a first region in which alkali ions are introduced; a second region in which alkali ions having a lower concentration than those of the first region are introduced or into which alkali ions are not introduced; a third region connected to the second region and extending in an interlayer distance by heat; and a fourth region connected to the first region and the third region and having an interlayer distance smaller than the third region.

Figure 1:
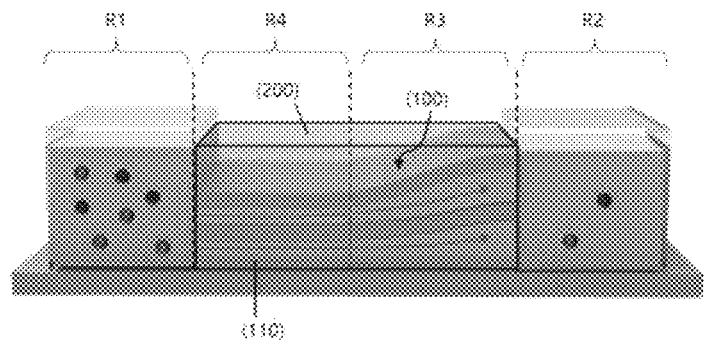
FIG. 1 is a perspective view illustrating an energy generating device according to an embodiment of the present disclosure.

The principle of energy generation will be described through a perspective view showing the energy generating device. Referring to FIG. 1, first, vermiculite 110 is laminated, and an asymmetrically partially expanded membrane 100 is laminated on the vermiculite layer, and the laminated film including this is divided into a third region R3 and a fourth region R4. The third region and the fourth region are connected to a first region R1 to which alkali ions are introduced and a second region R2 to which alkali ions having a lower concentration than those of the first region is introduced or to which alkali ions are not introduced. The third and fourth regions serve as channels through which ions may pass from the first region to the second region, and the red arrow in FIG. 1 indicates a movement direction of the ions.

As the energy generating device has an asymmetric structure, an interlayer spacing through which ions flow is different from each other, and accordingly, ion conductivity when the ions flow from the fourth region to the third region is different from that when flowing in the opposite direction. That is, ion selectivity allowing specific ions to flow and rectification allowing ions to preferentially pass in a specific direction may be performed. More specifically, the fourth region and the third region serve as a passage through which alkali ions having a positive sign may flow from the first region having a high concentration to the second region having a low concentration and have structural asymmetry, so that high ionic conductivity may be induced in the direction from the first region to the second region, and ionic conductivity may be suppressed in the opposite direction.

The energy generating device according to an embodiment of the present disclosure may lower resistance during energy generation by suppressing ion conduction in the reverse direction by introducing an asymmetric structure having the directionality of ion conduction, and may have an asymmetrical structure by partially expanding a material containing moisture. In addition, in order to facilitate peeling, it is possible to use a material that has a strong bond within the material layers and weak bonds between the material layers.

Accordingly, vermiculite may be used in the energy generating device according to the present disclosure. Vermiculite is composed of a magnesium-based octahedral sheet sandwiched between two tetrahedral silicate sheets, and is a lamellar mineral belonging to phyllosilicate. While strong chemical bonds such as covalent or ionic bonds are formed in intra vermiculite material layers, inter vermiculite material layers are bonded by weak attraction forces such as van der Waals forces. A laminated film in which such vermiculite is laminated and assembled may provide an interlayer distance of several Angstroms due to weak van der Waals bonding between the layers.

In addition, since moisture contained in a gas phase between the layers of vermiculite may contain a liquid phase-transformed to a liquid phase, the moisture between the laminated layers of vermiculite may be partially expanded, while being evaporated, by applying heat to advantageously produce an asymmetric structure.

In addition, the vermiculite may have a layer charge by isomorphic substitution in which tetravalent silicon (Si) present in a tetrahedral layer inside vermiculite is partially substituted with trivalent aluminum (Al). When the vermiculite has a layer charge, it generates an electrostatic attraction with respect to cations and an electrostatic repulsion force with respect to anions, thereby increasing cation selectivity in the third region, so that an energy generating device having selectivity to cations may be manufactured.

In addition, cations such as potassium and magnesium may be included in the vermiculite layer, and these cations may be exchanged with lithium ions in the vermiculite layer included in the energy generating device of the present disclosure, and since lithium ions have a hydration diameter larger than other cations, a layer gap is widened, and thus peeling may be easily performed.

In an embodiment, an average diameter of vermiculite may be 100 nm to 90 µm, or 100 nm to 10 µm, or 100 nm to 900 nm, or 100 nm to 700 nm. As the average diameter in the above range is satisfied, a fraction occupied by a space between vermiculites in a plane direction as well as a thickness direction in the laminated film may vary, and this spaced fraction may affect the selectivity and conductivity of alkali ions, particularly, sodium ions.

In an embodiment, alkali ions may be introduced into the first region, and alkali ions having a concentration lower than that of the first region may be introduced into the second region or alkali ions may not be introduced into the second region. Accordingly, since a concentration difference of alkali ions may be formed between the first region and the second region, the first region may be referred to as a high concentration region and the second region may be referred to as a low concentration region.

The alkali ion may include $Li^+$, $Na^+$, $K^+$, $Ru^+$, $Cs^+$, or mixed ions thereof, such as $Na^+$. The alkali ions are abundant on the earth, so that the supply and demand of raw materials are easy and the cost of power generation may be significantly reduced, and desired alkali ions may selectively migrate through the third region due to size characteristics of the third region in the presence of competing cations.

A difference in moles of alkali ions introduced into the first region and the second region may mainly affect a total power that may be generated by the energy generating device. Accordingly, when the third region and the fourth region have a constant dimension, greater power may be produced as the difference in concentration of alkali ions between the first region and the second region is greater. In addition, when there is a constant difference in alkali ion concentration between the first region and the second region, the greater power may be produced as the dimensions of the third region and the fourth region are greater. This is because electromotive force is generated as the alkali ions move from the first region to the second region through the fourth region and the third region due to the difference in the concentration of alkali ions between the first region and the second region.

The dimensions of the fourth and third regions and the concentration of alkali ions in the first and second regions (total number of moles of introduced alkali ions) may be appropriately adjusted in consideration of power generation characteristics required according to a specific application field of the energy generating device.

In an embodiment, the distance between the layers of the third region and the fourth region dividing the first region and the second region may be maintained constant due to physical restraint. Accordingly, even when the laminated film is in contact with a liquid phase, the interlayer distance of the vermiculite in the third region and the fourth region may not change but be maintained. By having the above structure, structural stability may be provided, and energy may be produced by moving alkali ions from the first region to the second region, while preventing ion conduction in an unwanted direction due to the third region and fourth region having an asymmetric structure.

Here, dividing the first region and the second region by the third region and the fourth region means that the first region and the second region are not in direct contact with each other to form a boundary in a thickness direction, a width direction, and a length direction, which are three directions of the laminated film orthogonal to each other but that the first region and the second region indirectly contact through the third region and the fourth region. Accordingly, the specific positions or shapes of the third and fourth regions are not particularly limited as long as the first region and the second region are divided.

An alkali ion concentration gradient may be formed in the third region and the fourth region due to a difference in alkali ion concentration between the first region and the second region. Lengths of the fourth region and the third region (hereinafter, referred to as a width of the membrane) in the direction from the first region to the second region may affect ionic conductance of the energy generating device. Here, the width of the fourth region may be 0.5 mm to 10 mm, or 1 mm to 6 mm, or 1 mm to 5 mm, and when the fourth region satisfies the width of the above range, a constant alkali ion concentration gradient may be formed so that desired selective conduction of alkali ions may be stably achieved by size characteristics. At this time, since the third and fourth regions may be defined as regions constrained by a physical constraining member 200, the widths of the third and fourth regions correspond to the width of the physical constraining member 200.

The physical constraining member is firmly bound to the membrane to physically constrain a change in the interlayer distance of the vermiculite layer, and it may be a rigid material stable to metal ions and moisture. For example, the physical restraining member may be a resin strip attached to the membrane covering both side surfaces (both surfaces in the thickness direction), while traversing the membrane in the width direction. In this case, covering both side surfaces should be interpreted as covering the side surface belonging to the third region, rather than covering the entire region of the side surface of the membrane. Here, the resin may be a curable resin which is heat, light (including UV), and/or chemically curable, and the curable resin may be a general curable material that can be used to prepare a polycarbonate-based resin, an acrylonitrile butadiene styrene resin, an olefin-based resin, an epoxy-based resin, a melamine-based resin, an unsaturated polyester-based resin, or the like by curing. Accordingly, the resin strip may be a cured polycarbonate-based resin, an acrylonitrile butadiene styrene resin, an olefin-based resin, an epoxy-based resin, a melamine-based resin, or an unsaturated polyester-based resin, but is not limited thereto.

In an embodiment, in the case of the third region (expandable region), it can be seen that the intensity of a diffraction peak present in the $2\theta$ range of 5 to 15°, which is a low angle range, in an X-ray diffraction pattern using Cu K$\alpha$ ray is weakened. In addition, since no clear diffraction peak is found in the $2\theta$ region, it can be seen that the interlayer distance of the laminated film is 2 nm or more, or 2 to 10 nm, or 3 to 6 nm.

The interlayer distance of the fourth region (non-expandable region) of the laminated film may be calculated through a peak position of the diffraction peak present in the $2\theta$ range of 5 to 15°, which is a low angle range, in the X-ray diffraction pattern using Cu K$\alpha$ ray. In addition, a size that enables the selective conduction of alkali ions in the fourth region is a size of a gap between the vermiculite layers (the size of a void space in the thickness direction), and such a gap size may be calculated by subtracting a thickness of the vermiculite layer itself from the vermiculite layer spacing. As a non-limiting example, the interlayer distance of the laminated film in the fourth region may be 1 to 9 Å, or 3 to 6 Å, or 4 to 6 Å.

In an embodiment, the thickness of the laminate film may be on an order level of $10^{-1}$ μm to $10^{2}$ μm, the length of the laminate film may be on an order level of $10^{-1}$ cm to $10^{1}$ cm, and the width of the laminate film may be on an order level of $10^{-1}$ cm to $10^{1}$ cm, but is not limited thereto.

In an embodiment, when the following conditions 1, 2 and 3 are satisfied, non-ohmic conductance between the first region and the second region may satisfy Equation 1 below.

Condition 1: The same alkali ion concentration in the first region and the second region,
Condition 2: 3 mm to 6 mm in length from the third region to the fourth region,
Condition 3: Voltage sweep range from −0.4 V to +0.4 V $$1 < I_{(+)}/I_{(-)} \tag{Equation 1}$$

(In Equation 1, $I_{(+)}$ is a current value in a positive voltage range, $I_{(-)}$ is a current value in a negative voltage range, and $I_{(+)}/I_{(-)}$ is a rectification ratio.)

In addition, when the average diameter of vermiculite is 100 nm to 10 μm, or 100 nm to 1500 nm, or 100 nm to 1000 nm, $I_{(+)}/I_{(-)}$ in Equation 1 is 1 or more, specifically 3 or more, and 5 or more as a highest value in all sweep voltage region.

Accordingly, total power or output voltage generated by the energy generating device may be controlled by one or more factors selected from among one or more physical factors selected from a thickness, width, and length of the laminated layer; and one or more chemical factors selected from a total number of moles of alkali ions introduced into the first region and a total number of moles of alkali ions introduced into the second region.

A method of using an energy generating device according to the present disclosure includes (a) introducing solutions of different concentrations into a first region and a second region; and (b) connecting electrodes to the first region and the second region.

In an embodiment, the introduction of alkali ions into the first region in step (a) may be accomplished by applying a solution containing alkali ions to the first region to satisfy a designed concentration. In this case, other cations or anions (including counter ions of alkali ions) may exist together with the alkali ions in the solution.

A method of manufacturing an energy generating device according to the present disclosure includes the steps of (a) laminating and assembling vermiculite to prepare a laminated film; (b) physically fixing a third region of the laminated film; (c) exposing a fourth region of the laminated film to a high temperature; (d) exchanging ions in the laminated film exposed to the high temperature; (e) physically fixing the third region and the fourth region; and (f) connecting the laminated film to a first region and a second region, wherein the third region is connected to the second region and the fourth region, and the fourth region is connected to the first region and the third region.

In an embodiment, the laminate film in step (a) may be prepared by a method commonly used for forming a laminate of vermiculite, such as filtration under reduced pressure of a dispersion of vermiculite.

Figure 2:
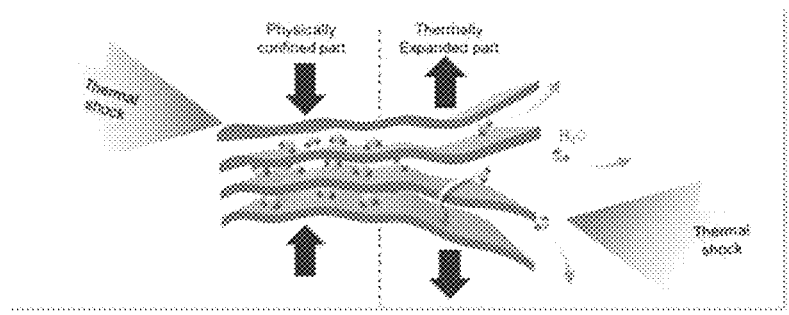
FIG. 2 is a schematic diagram illustrating a partial thermal expansion process for manufacturing a laminated film having an asymmetric structure according to an embodiment of the present disclosure.

In an embodiment, in the step of inducing partial thermal expansion in step (c), the fourth region may be exposed to heat of 500° C. or higher, specifically, exposed to an atmosphere of a temperature of 500° C. to 700° C., or directly exposed to fire at 1000° C. or higher. Referring to FIG. 2, it can be seen that, when the film is bonded to a substrate or constrained by physical force between materials, the membrane cannot expand even when exposed to high temperatures, but when the film is free and unconstrained, the moisture present inside the membrane rapidly evaporates and causes the membrane to swell.

In an embodiment, in the step of exchanging ions in step (d), the ions may be exchanged with ions having a larger hydration diameter than cations present in the vermiculite layer, and the ion exchange may be performed twice. As a non-limiting example, cations such as potassium, magnesium, and aluminum may be included in the vermiculite layer, and these cations may be exchanged with sodium ions having a larger hydration diameter, which may be exchanged with lithium ions having a larger hydration diameter.

In an embodiment, the physical fixation in steps (b) and (e) may be made by a resin strip coated with a curable resin and solidified. More specifically, in step (b), the curable resin may be applied to the fourth region, and in step (e), the curable resin may be applied to the entire region including the fourth region that is not expanded by heat and the third region that is thermally expanded, and in this case, the curable resin may be applied to cover at least both side surfaces and an upper surface of a designed region, and even a lower surface, if necessary, the lower surface, and a resin strip may be formed by applying heat or a curing agent, or light such as ultraviolet rays in consideration of spherical curing ability of the curable resin to manufacture.

Hereinafter, the present disclosure will be described in detail through examples. However, these are for describing the present disclosure in more detail, and the scope of the present disclosure is not limited by the following examples.

Example: Method of Manufacturing Energy Generating Device

Vermiculite nanosheets dispersed in an aqueous solution were laminated and assembled through a vacuum filtration method to prepare a vermiculite laminated membrane. A portion of the prepared membrane was exposed to the atmosphere, and the other portion was physically constrained between slide glasses, and then a thermal expansion reaction was induced at a temperature of 700° C. in an electric furnace. The partially thermally expanded vermiculite membrane was cut to size with scissors and then physically fixed to a substrate using epoxy. At both ends of the membrane, a container capable of containing an alkali solution was prepared like the first region and the second region of FIG. 1, and then electrodes were connected.

Experimental Example 1: Structural Analysis of Energy Generating Device

First, vermiculite laminated on the laminated film of the energy generating device of the present disclosure was observed through a scanning probe microscope (SPM).

Figure 3:
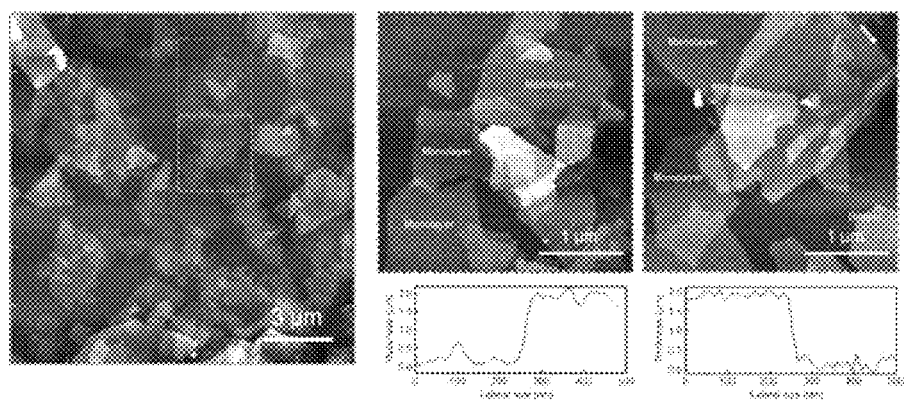
FIG. 3 is a result of a vermiculite single nanosheet scanning probe microscope analysis used in an energy generating device according to an embodiment of the present disclosure.

As can be seen from FIG. 3, it can be seen that most of the vermiculite materials used are a single layer, and it can be seen that an average diameter of the vermiculite is in the range of 100 nm to 1,500 nm.

Next, the entire surface of the laminated film of the energy generating device of the present disclosure was observed with a digital camera image, field emission scanning electron microscope (FE-SEM), and components were analyzed by dispersive spectroscopy (EDS).

Figure 4:
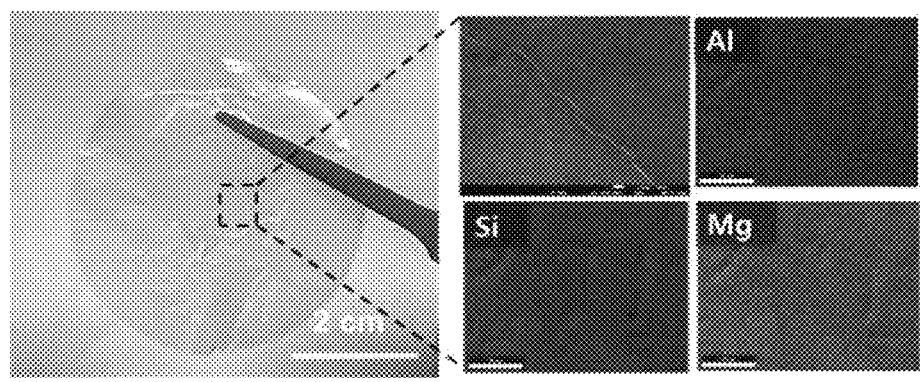
FIG. 4 is a digital camera image of a laminated film obtained by laminating and assembling vermiculite nanosheets, an image captured by a field emission scanning electronic microscope (FE-SEM), and a result of component analysis based energy dispersive spectroscopy according to an embodiment of the present disclosure.

As can be seen from FIG. 4, it can be seen that the initial laminated film which is laminated and assembled includes Al, Si, and Mg, which are key constituent elements of the vermiculite material.

Next, a side surface of the laminated film of the energy generating device of the present disclosure was observed with a digital camera image and FE-SEM.

Figure 5:
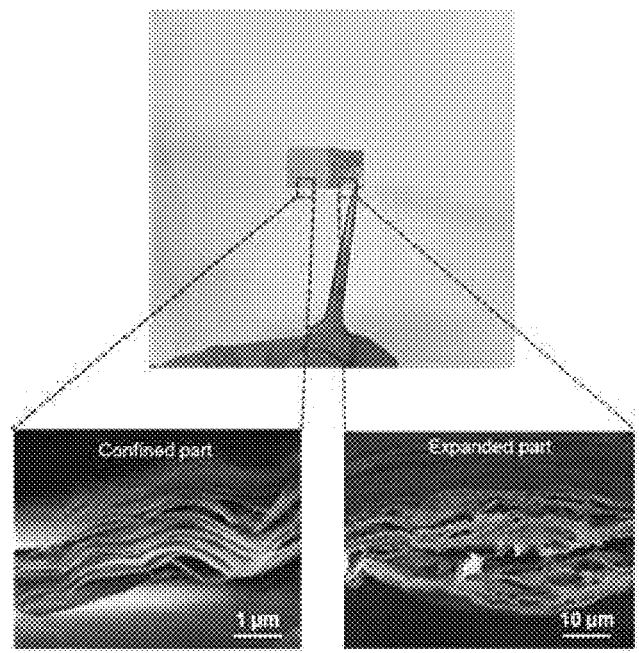
FIG. 5 is a digital image of an asymmetric laminated film to which a partial expansion method used in an energy generating device according to an embodiment of the present disclosure is applied, and a side image captured by an FE-SEM.

As can be seen from FIG. 5, a cross-section of the unexpanded vermiculite laminated film typically has a densely laminated structure, but it can be seen that the cross-section of the expanded vermiculite laminated film has a gap of several tens of nanometers and is expanded beyond that. In addition, an initial thickness of the vermiculite film is about 3 μm, and a thickness of the expanded part is close to 10 to 30 μm. It can be seen that both the expanded part and the non-expanded part have a length of 3 mm and the structure is fixed by the cured resin.

Next, X-ray diffraction patterns of the expanded part and the non-expanded part of the vermiculite in the partially expanded laminate structure used in the energy generating device of the present disclosure were measured.

Figure 6:
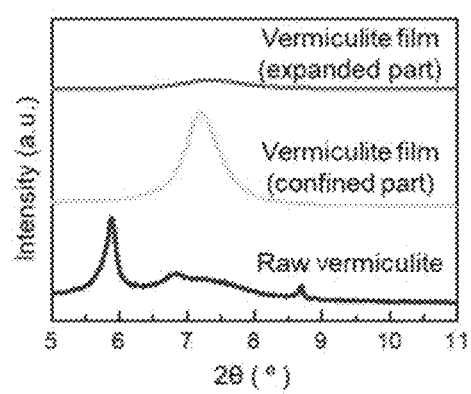
FIG. 6 is a graph of measured X-ray diffraction patterns of an unexpanded part and an expanded part of vermiculite and laminated film used in an energy generating device according to an embodiment of the present disclosure.

As can be seen from FIG. 6, the peak centered at 7.3° ($d_{001}$=12.1 Å) and 6° ($d_{001}$=14.5 Å) of vermiculite correspond to a {001} d-spacing of Mg-vermiculite with 1 and 2 hydration layers, respectively. The peak at 8.6° ($d_{001}$=10.3 Å) is due to the {001} diffraction of K-vermiculite. The re-laminated vermiculite membrane shows a single peak at 7.19° ($d_{001}$=12.3 Å), which is consistent with a gap between lithium intercalated and dried vermiculite. Through this, it can be seen that potassium ions ($K^+$) and magnesium ions ($Mg^{2+}$) present in the raw vermiculite were successfully exchanged into lithium ions ($Li^+$) in the peeling step. It can be seen that, in the X-ray diffraction pattern of the expanded part, the intensity of the diffraction peak existing in the 2θ range of 5 to 15°, in the low angle range, is weakened. Also, since no distinct diffraction peak was found in the corresponding 2θ region, it can be seen that an interlayer spacing of the membrane in the fourth region was 2 nm or greater.

Experimental Example 2: Performance Measurement of Energy Generating Device

Current-voltage was measured when 0.01 M NaCl solution was equally present in the first region and the second region in the energy generating device of the present disclosure and at the same concentration of the laminated film without partial expansion.

Figure 7:
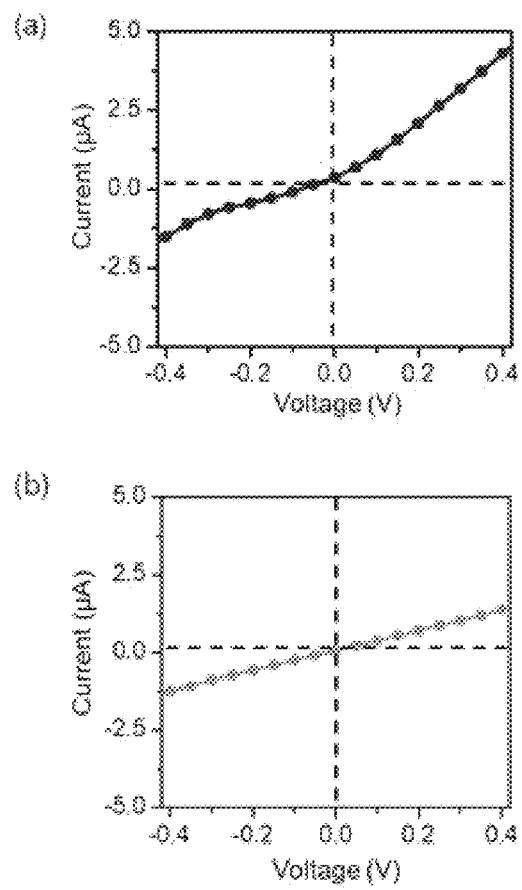
FIG. 7 is a current-voltage graph (FIG. 7(a)) when a solution of 0.01 M NaCl is present in an energy generating device according to an embodiment of the present disclosure and a current-voltage graph (FIG. 7(b)) of a laminated film without partial expansion.

FIG. 7(a) is a current-voltage graph when a 0.01 M NaCl solution is equally present in the first region and the second region in the energy generating device manufactured according to an embodiment of the present disclosure, and FIG. 7(b) is a current-voltage graph at the same concentration of the laminated film without partial expansion.

As a result of measuring the current in the voltage sweep range of −0.4 V to 0.4 V, it can be seen that the laminated film having an asymmetric structure has a higher current value at a positive voltage bias than at a negative voltage bias. It can be seen that the ion rectification phenomenon appears in the laminated film having the asymmetric structure manufactured according to an embodiment of the present disclosure. Meanwhile, it can be seen that, as a result of measuring the current in the voltage sweep range of −0.4 V to 0.4 V for the non-partially expanded laminated film, the current values are similar in the positive/negative voltage ranges without rectification.

Next, current-voltage was measured when a 0.5 M NaCl solution having the same concentration as that of seawater was introduced into the first region of the energy generating device of the present disclosure and when 0.01 M NaCl having the same concentration as that of fresh water was introduced into the second region, and at the same concentration of the laminated film which was not partially expanded.

Figure 8:
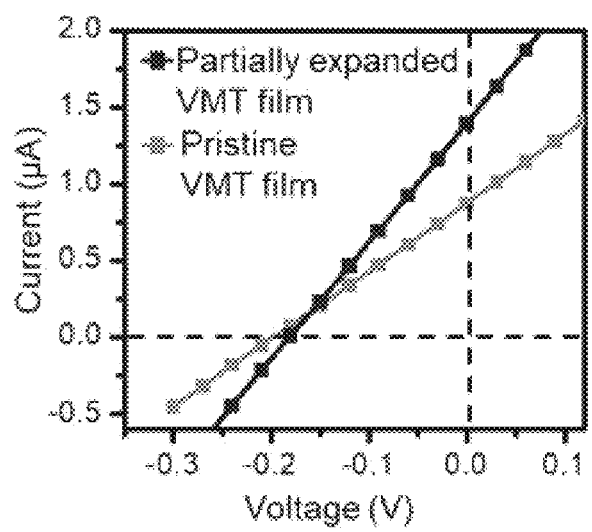
FIG. 8 is a graph showing characteristics of an energy generating device when 0.5 M NaCl is introduced into a first region and 0.01 M NaCl is introduced into a second region of the energy generating device according to an embodiment of the present disclosure.

As can be seen from FIG. 8, an open circuit voltage ($V_{oc}$) of the energy generating device (partially expanded VMT film) using the laminated film of the asymmetric structure is 0.18V, and the energy generating system (Pristine VMT film) using the laminated film of the symmetric structure is 0.185V. It can be seen that a short-circuit current value is about 50% higher in the energy generating system using the laminated film having an asymmetric structure. Through this, it can be seen that, since the vermiculite laminate assembly laminated film having an asymmetric structure has directionality of ion conduction, when cations diffuse into the laminated film due to a concentration difference, behavior of ions moving reversely is suppressed, obtaining an effect of reducing the resistance.

Hereinabove, although the present disclosure is described by specific matters, exemplary embodiments, and drawings, they are provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the above-described embodiments, and the following claims as well as all modified equally or equivalently to the claims are intended to fall within the scope and spirit of the disclosure.

The invention claimed is:

1. An energy generating device for producing power by conduction of alkali ions through an ion transport channel having an asymmetric structure,
wherein the energy generating device includes a first region in which alkali ions are introduced; a laminated film in which vermiculite is laminated and assembled; and a second region in which alkali ions having a lower concentration than those of the first region are introduced or into which alkali ions are not introduced,
wherein the laminated film is divided into
a third region connected to the second region and extended in an interlayer distance by heating; and
a fourth region connected to the first region and the third region and having an interlayer distance smaller than the third region, and
wherein the third and fourth regions are constrained by a physical constraining member, and the widths of the third and fourth regions correspond to the width of the physical constraining member.

2. The energy generating device of claim 1,
wherein a liquid in which moisture contained in a gas phase is transformed into a liquid phase is included between the layers of vermiculite.

3. The energy generating device of claim 1,
wherein the energy generating device has selectivity for cations.

4. The energy generating device of claim 1,
wherein lithium ions are included inside the vermiculite layer.

5. The energy generating device of claim 1,
wherein a length of the fourth region in a direction from the first region to the second region is 0.5 to 10 mm.

6. The energy generating device of claim 1,
wherein an interlayer spacing of the laminated film in the third region is 2 nm or more.

7. The energy generating device of claim 1,
wherein an interlayer spacing of the laminated film in the fourth region is 1 to 9 Å.

8. The energy generating device of claim 1,
wherein when the following conditions 1, 2 and 3 are satisfied, the non-ohmic conductance between the first region and the second region satisfies Equation 1 below,
Condition 1: The same alkali ion concentration in the first region and the second region,
Condition 2: 3 mm to 6 mm in length from the third region to the fourth region,
Condition 3: Voltage sweep range from −0.4 V to +0.4 V $$1 < I_{(+)}/I_{(-)} \qquad \text{(Equation 1)}$$

(In Equation 1, $I_{(+)}$ is a current value in a positive voltage range, $I_{(-)}$ is a current value in a negative voltage range, and $I_{(+)}/I_{(-)}$ is a rectification ratio).

9. The energy generating device of claim 1,
wherein total power or output voltage generated by the energy generating device is controlled by one or more factors selected from among one or more physical factors selected from a thickness, width, and length of the laminated layer; and one or more chemical factors selected from a total number of moles of alkali ions introduced into the first region and a total number of moles of alkali ions introduced into the second region.

10. An energy generating module to which the energy generating device according to claim 1 is connected in series.

11. The energy generating device of claim 1,
wherein an average diameter of the vermiculite is 100 nm to 90 μm.

12. The energy generating device of claim 1,
wherein an average diameter of the vermiculite is 100 nm to 1500 nm.

13. The energy generating device of claim 1,
wherein a width of the fourth region is 0.5 mm to 10 mm.

14. The energy generating device of claim 1,
wherein an interlayer spacing of the laminated film in the third region is 3 nm or more.

* * * * *